(12) United States Patent
Dorbie et al.

(10) Patent No.: US 6,768,492 B2
(45) Date of Patent: Jul. 27, 2004

(54) TEXTURE TILING WITH ADJACENCY INFORMATION

(75) Inventors: Angus Dorbie, Mountain View, CA (US); Ze Hong (Jenny) Zhao, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 09/971,098

(22) Filed: Oct. 5, 2001

(65) Prior Publication Data

US 2002/0070947 A1 Jun. 13, 2002

Related U.S. Application Data

(60) Provisional application No. 60/238,128, filed on Oct. 6, 2000.

(51) Int. Cl.[7] ................................................. G09G 5/00
(52) U.S. Cl. ....................................................... 345/582
(58) Field of Search ................................ 345/582–587, 345/588, 538, 552, FOR 211

(56) References Cited

U.S. PATENT DOCUMENTS 5,230,039 A * 7/1993 Grossman et al. ........... 395/130
5,461,712 A * 10/1995 Chelstowski et al. ........ 395/164
5,815,157 A * 9/1998 Bowen ......................... 345/430

* cited by examiner

Primary Examiner—Matthew C. Bella
Assistant Examiner—G. F. Cunningham
(74) Attorney, Agent, or Firm—Woodcock Washburn LLP

(57) ABSTRACT

A method, system, and computer program product are provided for texture tiling with adjacent information. Adjacency information is supplied for one or more potential tiling directions. In one example, adjacency information is supplied for eight potential tiling directions radiating in eight different directions relative to an original texture image. In another example, adjacency information is supplied for three potential tiling directions. The present invention provides a solution that allows the specification of a texture image as a border to another for texture tiling purposes. This means that when texture addressing extends beyond the region within a texture map another texture image is addressed. During texture processing, in mapping a graphics primitive to adjacent border textures, two steps are carried out. The first step evaluates texture coordinate values to determine when texture coordinates are outside a range of a base texture image being texture mapped. The second step determines which adjacent border texture corresponds to the texture coordinates evaluated to be outside the base image. This determination is made using adjacency information which identifies the direction of the adjacent border texture relative to the base image.

18 Claims, 21 Drawing Sheets

Texture Image

Graphics Primitive

Texture coordinates map Texure Image to Graphics Primitive

Sometimes Graphics Primitives extend beyond Texture Image

Image 1 has several adjacent images specified, each determined by the direction of tiling. In this case, eight images (2-9) are associated

TEXTURE TILING WITH ADJACENCY INFORMATION

CROSS-REFERENCE TO RELATED APPLICATIONS

This application claims the benefit of U.S. Provisional Application No. 60/238,128, filed Oct. 6, 2000, the full text of which is incorporated herein by reference as if reproduced in full below.

BACKGROUND OF THE INVENTION

1. Field of the Invention

The present invention relates generally to computer graphics.

2. Related Art

Computer graphics systems render all kinds of objects for screen display and animation. An object is modeled in object space by a set of primitives (also called graphics primitives). Examples of primitives include, but are not limited to, triangles, polygons, lines, tetrahedra, curved surface, and bit-map images. Each primitive includes one or more vertices that define the primitive in terms of position, color, depth, texture, and/or other information helpful for rendering. Each primitive can be further broken up into fragments. Each fragment when projected for rendering on a screen, corresponds to all or part of an area of one pixel. For example, a polygon or curved surface can be broken up through scan conversion into fragments. Fragments can also include vertices or per-vertex information.

Textures are used to add further visual information. By utilizing texture mapping techniques, color and other details can be applied to areas and surfaces of objects. In texture mapping, a pattern image (also referred to as a "texture" or texture map") is combined with an area or surface of an object to produce a modified object with the added texture detail. For example, given the outline of a featureless cube and a texture map defining a wood grain pattern, texture mapping techniques can be used to "map" the wood grain pattern onto the cube. The resulting display is that of a cube that appears to be made of wood. In another example, terrain (e.g., images of a town, river, vegetation and trees) can be added by texture mapping to an otherwise barren terrain model.

The demand for large textures is increasing. Many graphics applications increasingly demand a large contiguous texture. The cost of increasing texture memory and/or hardware to accommodate a large contiguous texture can be prohibitive.

Due to the importance of large contiguously textured databases to many graphics applications, schemes have been implemented which allow an application to apply massive textures over databases such as terrain, while operating within the limited constraints of hardware resources. These have ranged from software-only schemes which slice the underlying geometry into tiles corresponding to texture files, to hardware implementations which treat the image as a homogeneous entity.

Consider two examples of such schemes, clip-mapping and texture tiling. Clip-mapping is a relatively specialized and sophisticated scheme that uses a clip-map. See, U.S. Pat. No. 5,780,783 issued to Migdal et al. and incorporated in its entirety herein by reference. For example, a clip-map can be a multiresolutional texture map pyramid (such as, a MIP map) clipped to a "clip size" that covers a single view being rendered. See, the example clip-map MW pyramid 100 in FIG. 1A. The image space is treated as a homogeneous entity for texturing purposes. Paging supplies a region 102 of high resolution in the area of most immediate interest with decreasing resolution as one moves away from the region of interest. Naturally the region of interest may be moved with the viewer in order to sustain high resolution in an animated scene. Torroidally wrapped texture addressing can be used to accommodate texture updates in clip-mapping. See, e.g., Tanner et al., "The Clipmap: A Virtual Mipmap," Computer Graphics Proceedings, Annual Conf. Series, 1998 (SIGGRAPH '98), pp. 151158. As depicted in FIG. 1B, such torrodial wrapped texture addressing allows new data 102B to be added to a clip-map tile as old data 102A is removed. This is a relatively complex scheme which can be difficult to adopt in many applications which drive consumer-level products.

Texture tiling creates a series of tiles. The tiles represent portions of a contiguous image space. These tiles are applied as unique textures with associated unique texture identifiers (referred to herein as "texture IDs" or "texture handles") to a series of tiled geometry segments. This requires that the application or database creator chop the geometric database into tiles to match the texture representation. A database is triangulated when it is chopped up to meet image paging requirements. FIG. 1C shows how an example triangle primitive 110 might have to be divided into four parts when it overlays four texture image tiles (Tile 1, Tile 2, Tile 3, and Tile 4).

Furthermore, as the database is viewed from a distance, ideally one would like fewer tiles to be applied to the database requiring that a quad tree or similar tiling structure be implemented to manage geometric complexity; this in turn requires a quad tree texture representation. While not entirely forced by the geometric issues, a software implementation quickly becomes a rather unwieldy proposition and suffers from some flaws. If implemented without consideration of filtering at the borders of the texture boundaries, there will be apparent texture filtering discontinuities across tile boundaries. The magnitude of these boundaries varies with the level of MIP map being applied to the respective tiles.

Graphics hardware has been built which avoids the need to subdivide the geometry using fragment selection within the range of the texture and multipass rendering on the underlying geometry. With this approach, any fragment outside the immediate texture image is not rasterized. This test is performed repeatedly with different images in different locations in a sequence of rendering passes. The issue of filtering then remains.

One or more extensions have been implemented to cope with filtering while subdividing the geometry in the application. For instance, texture border image support has been designed into graphics hardware implementations to allow filtering under these circumstances to be handled smoothly. Using such a scheme as described in U.S. Pat. No. 5,230,039, which is incorporated herein by reference in its entirety, a portion of the adjacent tile is specified by the application for filtering purposes. This scheme still requires the subdivision of the database based on texture border tiles, but it avoids the filtering artifacts at the tile edges. FIG. 1D shows an example that illustrates the specification of borders to avoid filtering issues. As illustrated, a triangle 120 is divided into fragments 120A and 120B. Fragment 120A will be textured with tile 1 while fragment 120B will be textured with tile 2. Note border portion 122 of fragment 120A and border portion 124 of fragment 120B. These border portions 122,124 will be textured with border portions 126,128 of texture tiles 1 and 2. This scheme provides filtering for a smooth transition between the texture tiles. However, the drawback of having to break the geometry into tiles remains.

A modified scheme described in U.S. Pat. No. 5,815,157, which is incorporated herein by reference in its entirety, uses an adjacent portion of texture memory to store borders of the image tile under consideration to the side of a tile in an oversized region of texture memory. A variation on the scheme is to use a larger portion of texture memory and a texture matrix to manipulate the application of texture coordinates such that the tile of texture under consideration and its borders become part of a contiguous texture memory space. FIG. 1E illustrates an example of an adjusted layout in memory for contiguous mapping. Note texture tile 130 and borders 132 which are stored in a larger portion 134 of texture memory.

To eliminate the strict requirement for geometry subdivision along tile boundaries, a scheme can be implemented where overlapping textures are applied to the image in texture memory. Instead of clamping to the original image boundary, the adjacent images may be addressed for triangles which extend a short way beyond the conventional image border. If one rearranges the in memory representation described in U.S. Pat. No. 5,815,157, it can be seen that conventional hardware may be used and the subdivision of database triangles is avoided. By placing the original texture tile in the center of an oversized texture, it is easy to see that the border images are simply extensions of the original tile in a conventional texture memory addressing scheme.

Another way of visualizing this type of scheme is to see that the texture tiles in memory are actually overlapping with each other. The reason this is done is to avoid geometry which must be textured with two or more separate textures. A remaining constraint on the geometry is that primitives near the edge of a tile may not exceed the size of the region of overlap. FIG. 1F illustrates an example of overlapping texture borders which can be used to supply a single texture to graphics primitives without subdivision. For example, FIG. 1F illustrates texture tiles 1 and 2 which share a common overlap region 140. As a result of overlap region 140, triangle T1 can be textured using only texture tile 1. Similarly, triangle T3 can be textured using only texture tile 2. Triangle T2 can be textured using either of texture tiles 1 or 2 since it lies entirely in overlap region 140. The price of this scheme is increased texture memory usage and redundant texture paging to supply the data for the region of overlap. It also requires non-trivial management of texture memory, since the data on disk is likely to be in a tiled format without the overlap, subloading of texture. Images with memory strides is required, which further reduces paging performance.

What is desired is the ability to decouple geometry from texture tiling and to avoid the need to implement difficult or complex torroidal mapping schemes or tricky underused border schemes. It is also desirable to avoid the redundancy of overlapping texture schemes while increasing the ease of implementation and performance of a paging approach. A system and method is needed which can apply unique texture over extended areas with limited hardware texture memory (requiring paging) while imposing few restrictions upon a database. Extensive hardware, onerous restrictions upon a database, and/or difficult implementations which waste paging bandwidth need to be reduced or avoided.

BRIEF SUMMARY OF THE INVENTION

The present invention solves the above problems and needs. In one embodiment, a novel graphics extension is provided that allows an application to seamlessly apply large contiguous texture over a database while supporting the paging of texture and operating within the constraints of limited available texture memory and real-time rendering requirements.

In one embodiment, the present invention provides a solution that allows the specification of a texture image as the border to another for texture tiling purposes. This means that when texture addressing extends beyond the region within a texture map another image is addressed instead of a repeated version of the original image or a border color or a reflected version of the image as is currently common practice. This specification of a border image would include the ability to specify different texture images for each of the 8 tiling directions: +s, −s, +t, −t, +s+t, −s−t, −s+t, and +s−t. Using this system, an array of images could be linked to one other to form a massive meta image. Within the region covered by these images, a graphics primitive such as a triangle or triangle strip which is less than the size of 3 individual images could be textured with a single unique texture tile. Tiles could optionally be paged and even joined at different resolutions. In addition more parameters could be optionally supported to allow the mapping of different sized images to be adjacent to one another (to allow different sized tiles at different resolutions over various parts of a database).

In one embodiment, a routine for texture processing uses texture tiling and adjacency information. A base texture image and adjacent border textures are loaded in texture memory. The base texture image is associated with adjacency information. A graphics primitive is then mapped to adjacent border textures identified by the adjacency information. In one example, this mapping includes evaluating texture coordinate values to determine when texture coordinates are outside a range of a base texture image being texture mapped, and determining which adjacent border texture corresponds to the texture coordinates evaluated to be outside the base image. This determination is made using adjacency information which identifies the direction of the adjacent border texture relative to the base image.

The present invention can be used by a broad base of developers and is applicable to many general rendering tasks. The implementation of the present invention can be straightforward. The size of primitives at the borders can be increased. The size of graphics primitives is not constrained by the size/redundancy of an overlap region. This improves the ease of use, reduces the database constraints and potentially increases the adoption of a system and method according to the present invention by software developers.

The present invention provides a more generally applicable extension than clip-mapping alone. This extension has broad use in graphics applications while being easy to implement and straighforward to program.

Further, geospecific texture mapping is a key requirement for many applications. The present invention makes database and software support for geospecific paging easier, it also makes it more likely to be adopted by independent hardware vendors (IHVs) given the generally useful nature of the idea.

By providing a texture object with border textures for tiling purposes, the present invention can elegantly extend the capability of existing hardware to support unrestricted texture roaming with little or no texture memory redundancy and few restrictions on database construction. It avoids the traditional problem of having to chop up the database into tiles and does not require that overlapping images in memory be created.

The present invention can be used in any graphics application, toolkit, library, software, hardware or other graphics system.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

Figure 6:
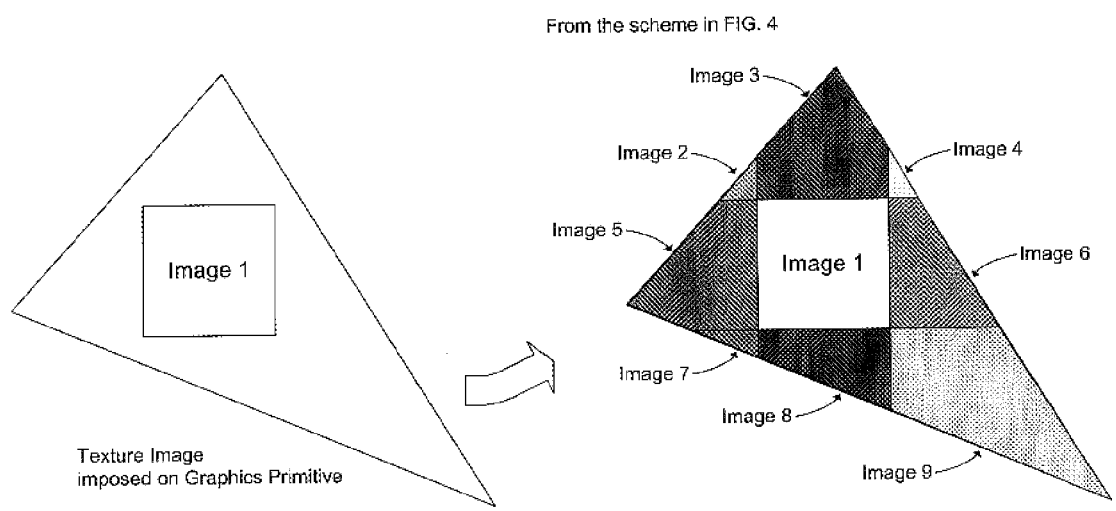
FIG. 6 shows how a graphics primitive that extends beyond the Image1 tile in FIG. 4 is texture mapped according to the present invention.
Figure 7:
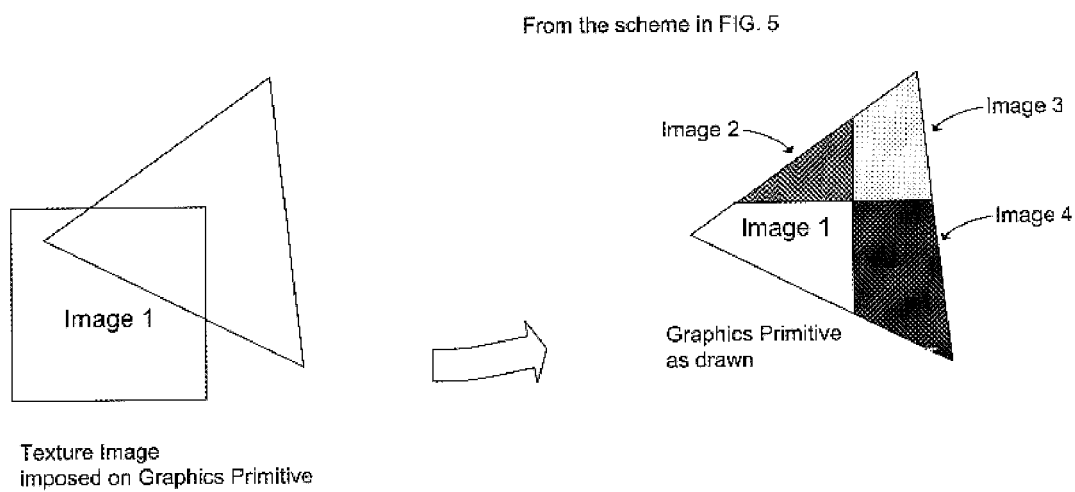
FIG. 7 shows how a graphics primitive that extends beyond the Image1 tile in FIG. 5 is texture mapped according to the present invention.
Figure 8A:
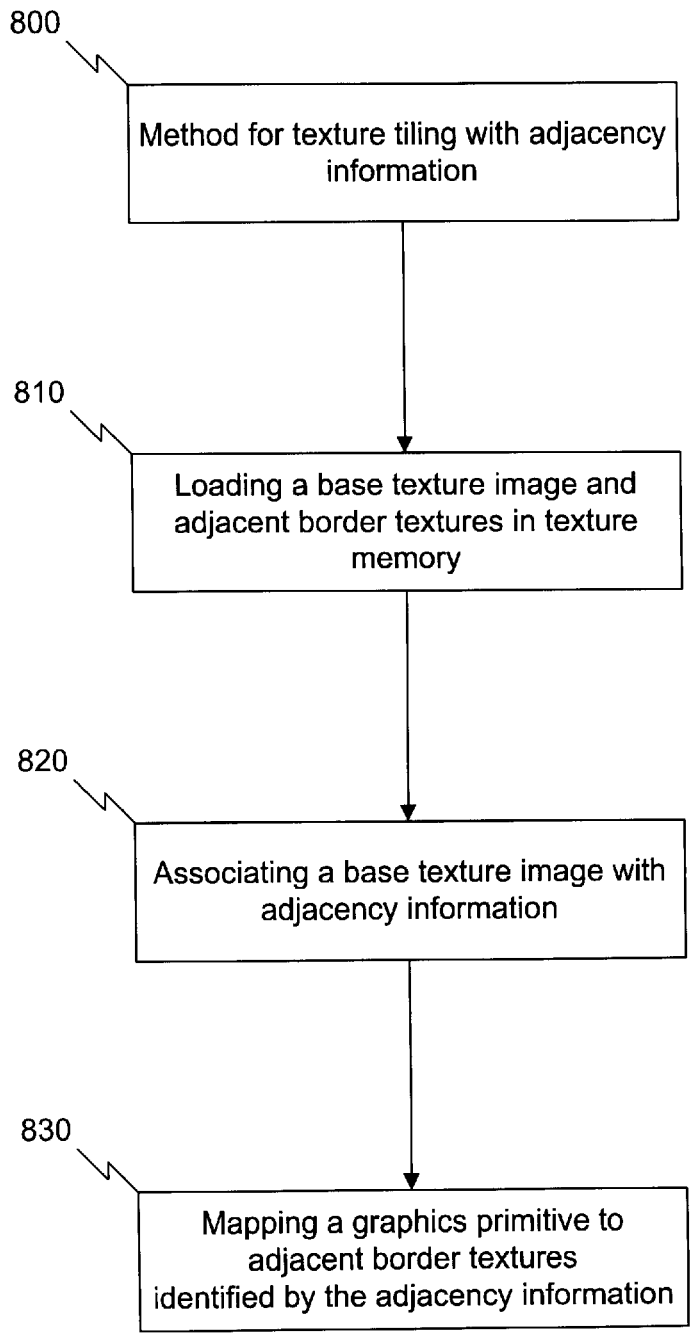
FIG. 8A shows a routine for texture processing using texture tiling and adjacency information according to one embodiment of the present invention.
Figure 8B:
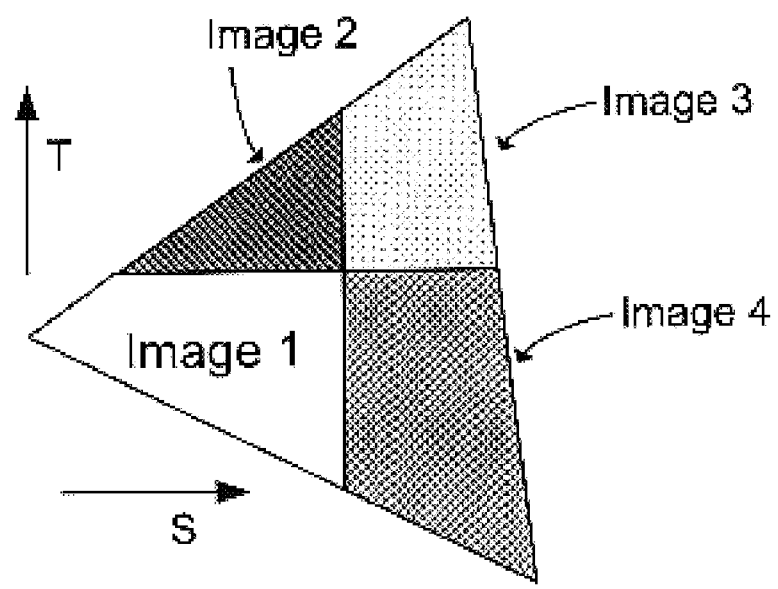

FIG. 8B further shows these texture processing steps are carried out with respect to examples of FIGS. 4–7 according to the present invention.

Figure 9:
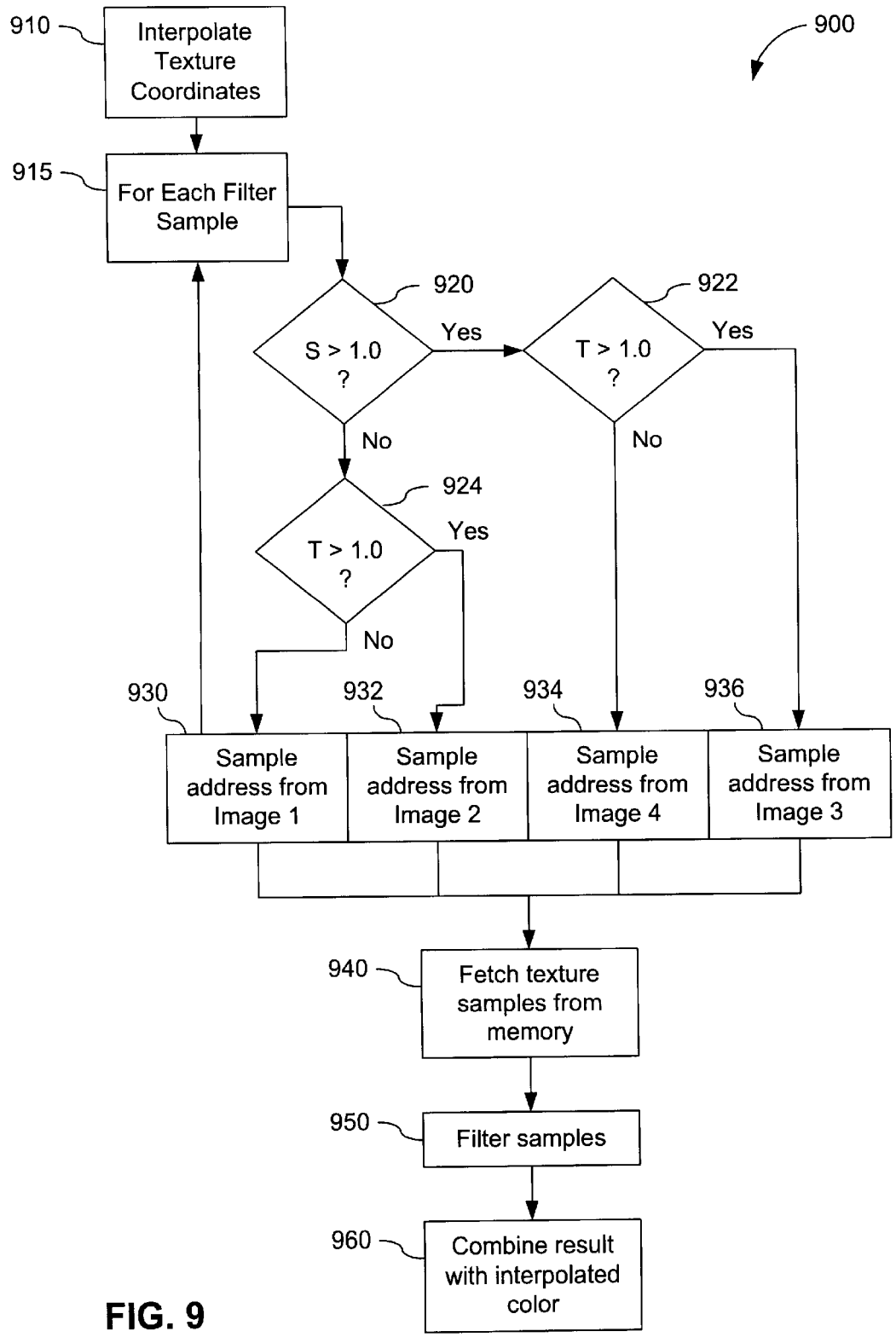

FIG. 9 shows a routine for texture processing using texture tiling and adjacency information according to one embodiment of the present invention.

Figure 10:
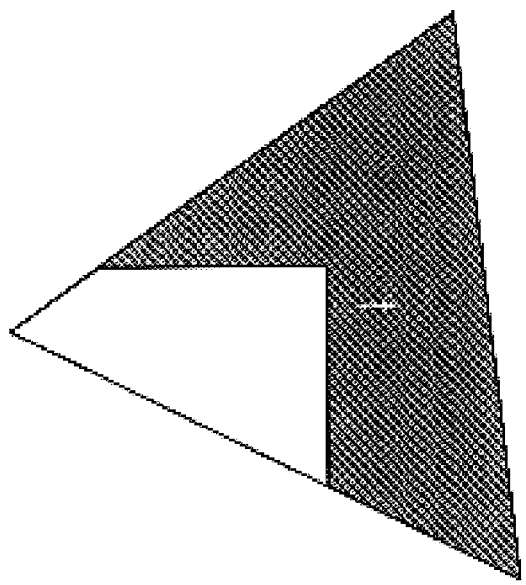

FIG. 10 shows an example of the primitive of FIG. 7 processed with a single texture unit with black border color to produce an image with texture only where coordinates fall between 0 and 1 according to an embodiment of the present invention.

Figure 11:
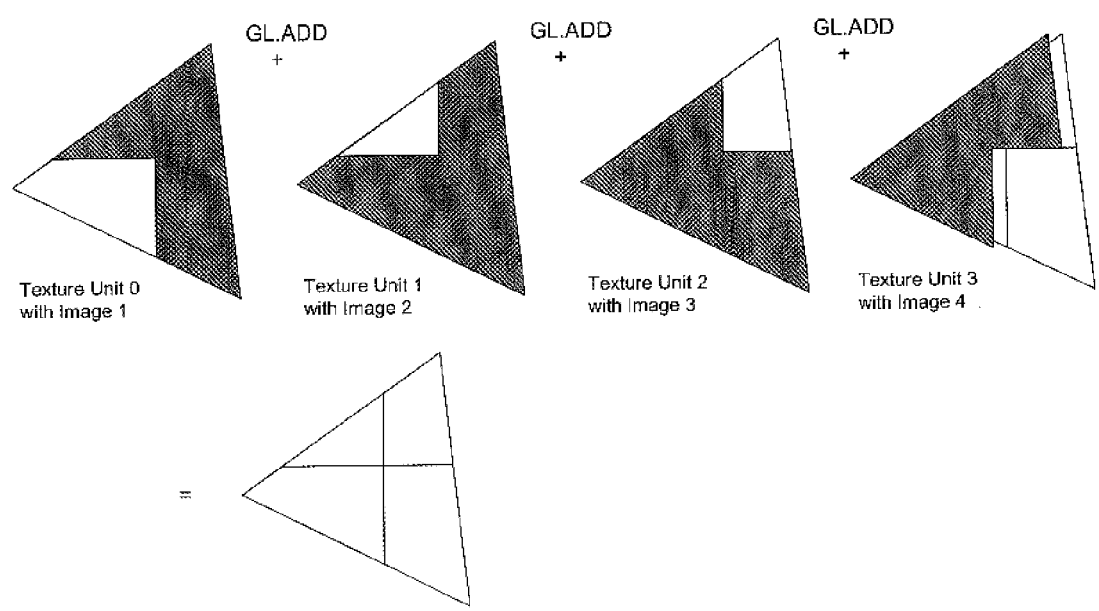

FIG. 11 shows how multi-texture units can be used to carry out an embodiment of the present invention.

Figure 12A:
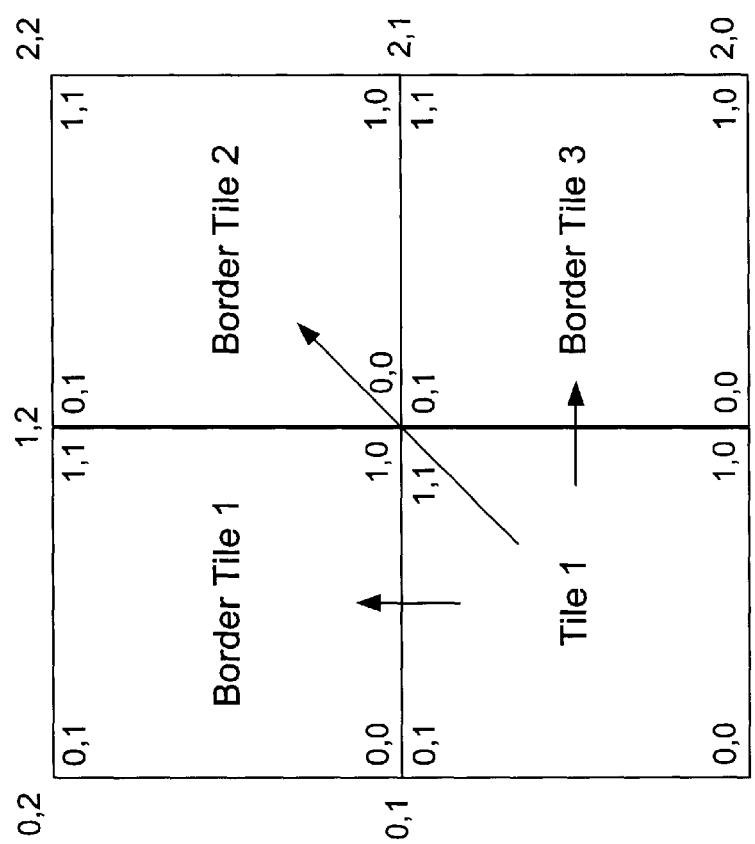

FIG. 12A shows an example of how texture coordinates transform from an initial texture tile map in three directions denoted by arrows to three adjacent border texture tiles according to the present invention.

Figure 12B:
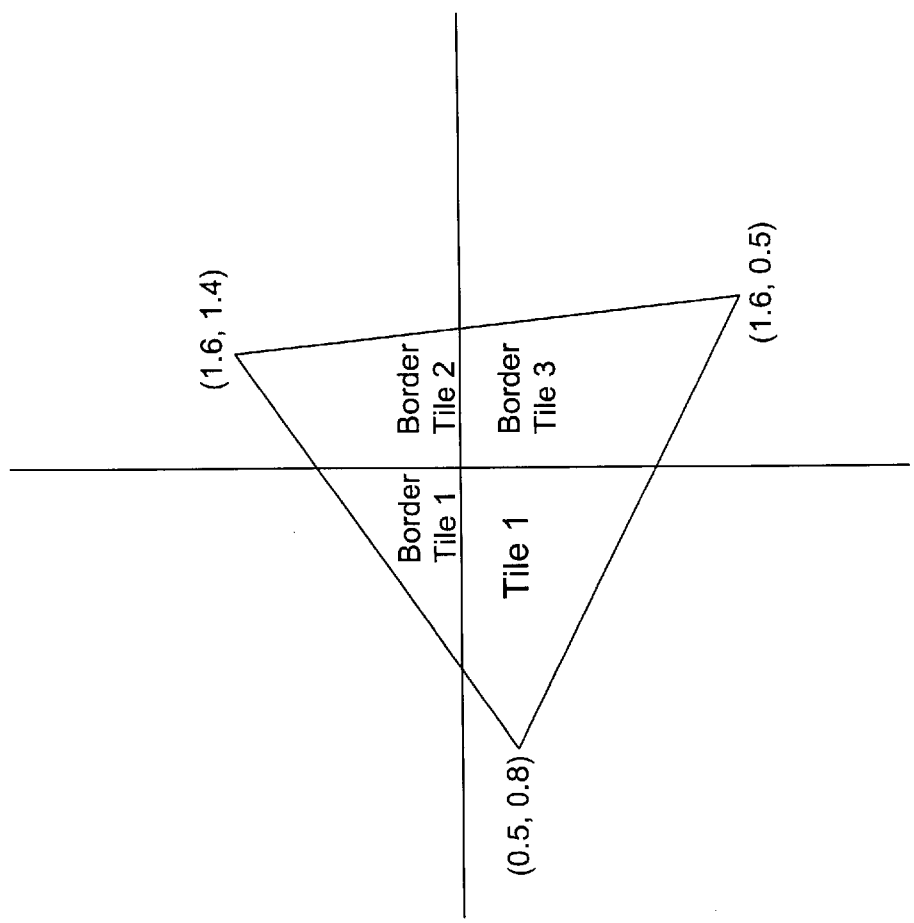

FIG. 12B shows an example of how three adjacent border texture tiles are applied to a primitive when rendering with an initial texture tile map according to the present invention.

Figure 13:
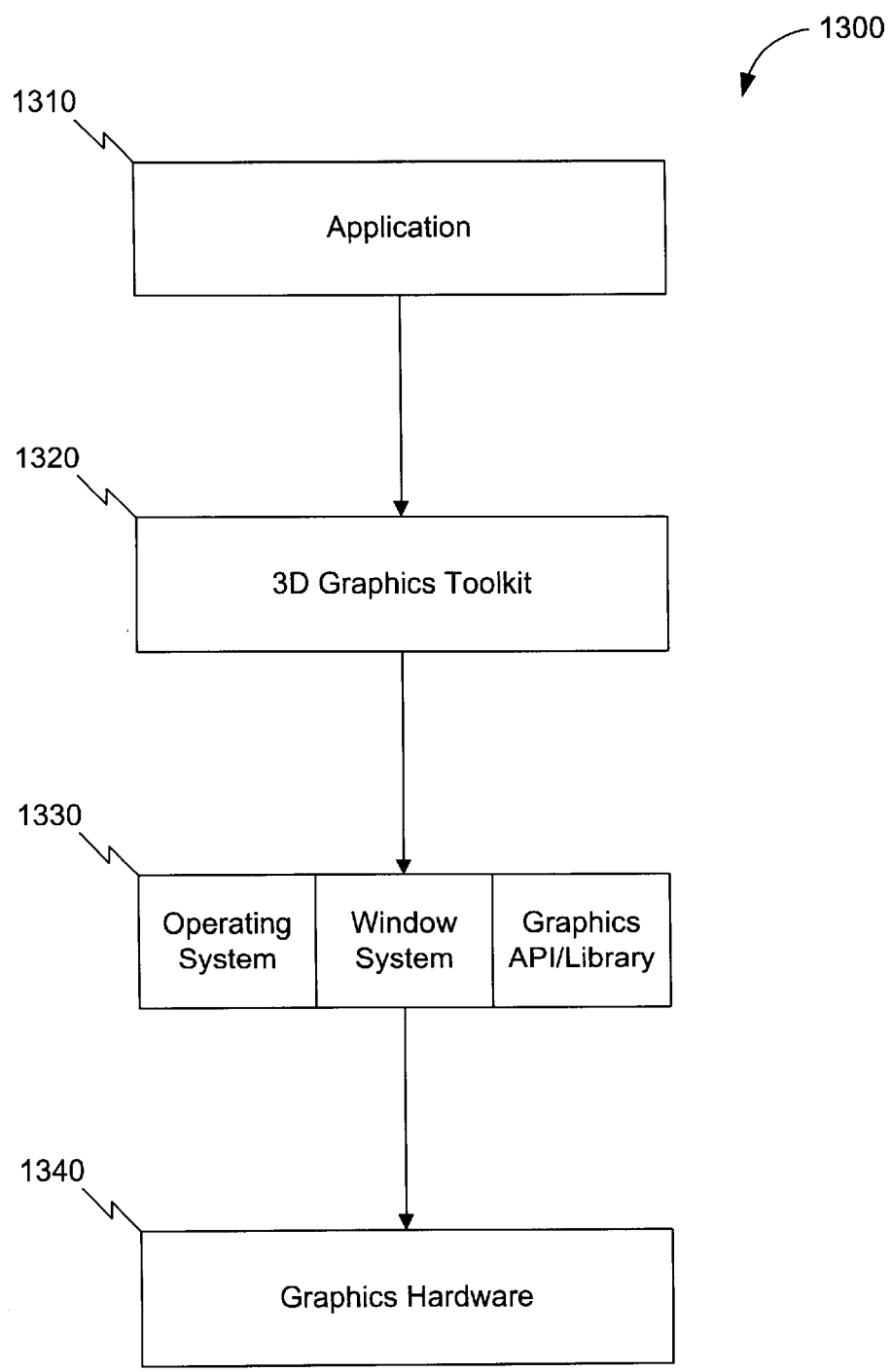

FIG. 13 is a diagram of an example architecture in an implementation of the present invention.

DETAILED DESCRIPTION OF THE INVENTION

Terminology

The term "adjacency information" refers to any information that directly or indirectly identifies, points to, or names one or more textures adjacent to a particular texture of interest. For example, adjacency information can include but is not limited to information that identifies one or more tiles adjacent to a texture tile associated with a primitive. This adjacency information can include one or more texture handles or texture IDs for a texture object. Adjacency information is supplied for one or more potential tiling directions.

Texture Tiling with Adjacency Information

The present invention provides a method, system, and computer program product for texture tiling based on adjacency information. Adjacency information is supplied for one or more potential tiling directions. In one example, adjacency information is supplied for eight potential tiling directions radiating in eight different directions relative to an original texture image. In another example, adjacency information is supplied for three potential tiling directions.

The present invention provides a solution that allows the specification of a texture image as a border to another for texture tiling purposes. This means that when texture addressing extends beyond the region within a texture map another texture image is addressed.

This specification of a border image includes the ability to specify different adjacent textures for each of the 8 tiling directions: +s, −s, +t, −t, +s+t, −s−t, −s+t, and +s−t. In the present invention, an array of images can be linked to each other to form a massive meta image. Within the region covered by these images, any graphics primitive such as a triangle or triangle strip which was less than the size of three individual images could be textured with a single unique texture tile. Tiles could optionally be paged and even joined at different resolutions, in addition more parameters could be optionally supported to allow the mapping of different sized images to be adjacent to each other to allow different sized tiles at different resolutions over various parts of a database.

In one embodiment, an extension adds a texture clamping behavior. This extension allows an application to supply adjacent information that identifies one or more tiles adjacent to a texture tile. This adjacency information can include texture handles for a texture object. This extension can be implemented in software, firmware, hardware or any combination thereof. In one embodiment, this extension is added to a graphics application programming interface or library, such as, but not limited to OPENGL, available from Silicon Graphics, Inc. Mountain View, Calif.

When rendering with an original texture bound, if the texture coordinates are outside the range of 0.0 to 1.0 then instead of existing options to clamp or to tile the image, another adjacent texture image would be used to tile instead. Adjacency information is supplied for one or more potential tiling directions. In one example, adjacency information is supplied for eight potential tiling directions radiating in eight different directions relative to an original texture image. Supplying all eight directions provides a symmetry that appeals to software developers. In another example, adjacency information is supplied for three potential tiling directions.

Figure 1A:
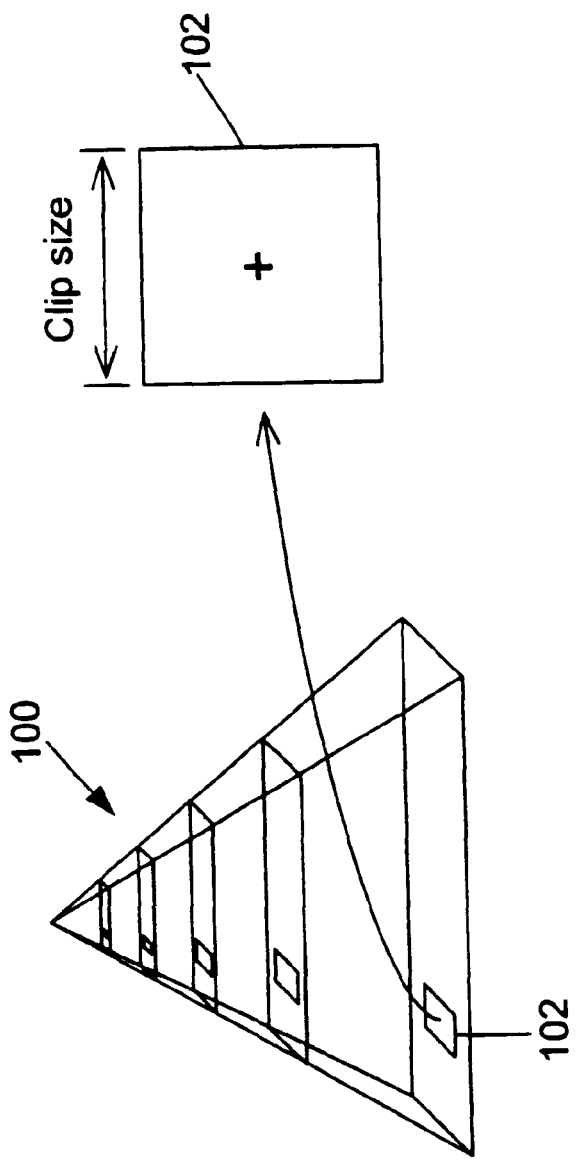
FIG. 1A shows an example memory representation of a clip-map.
Figure 1B:
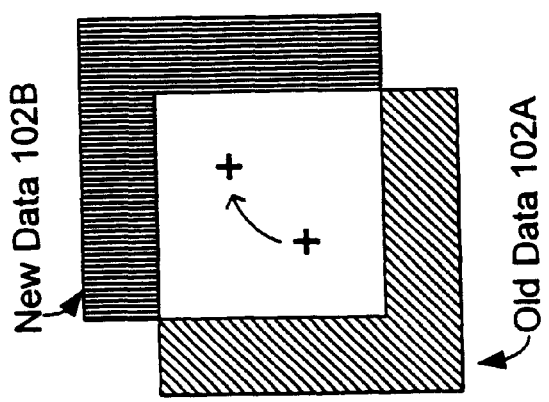
FIG. 1B shows updating new data in a clip-map tile for a single clipped level of MIP map.
Figure 1C:
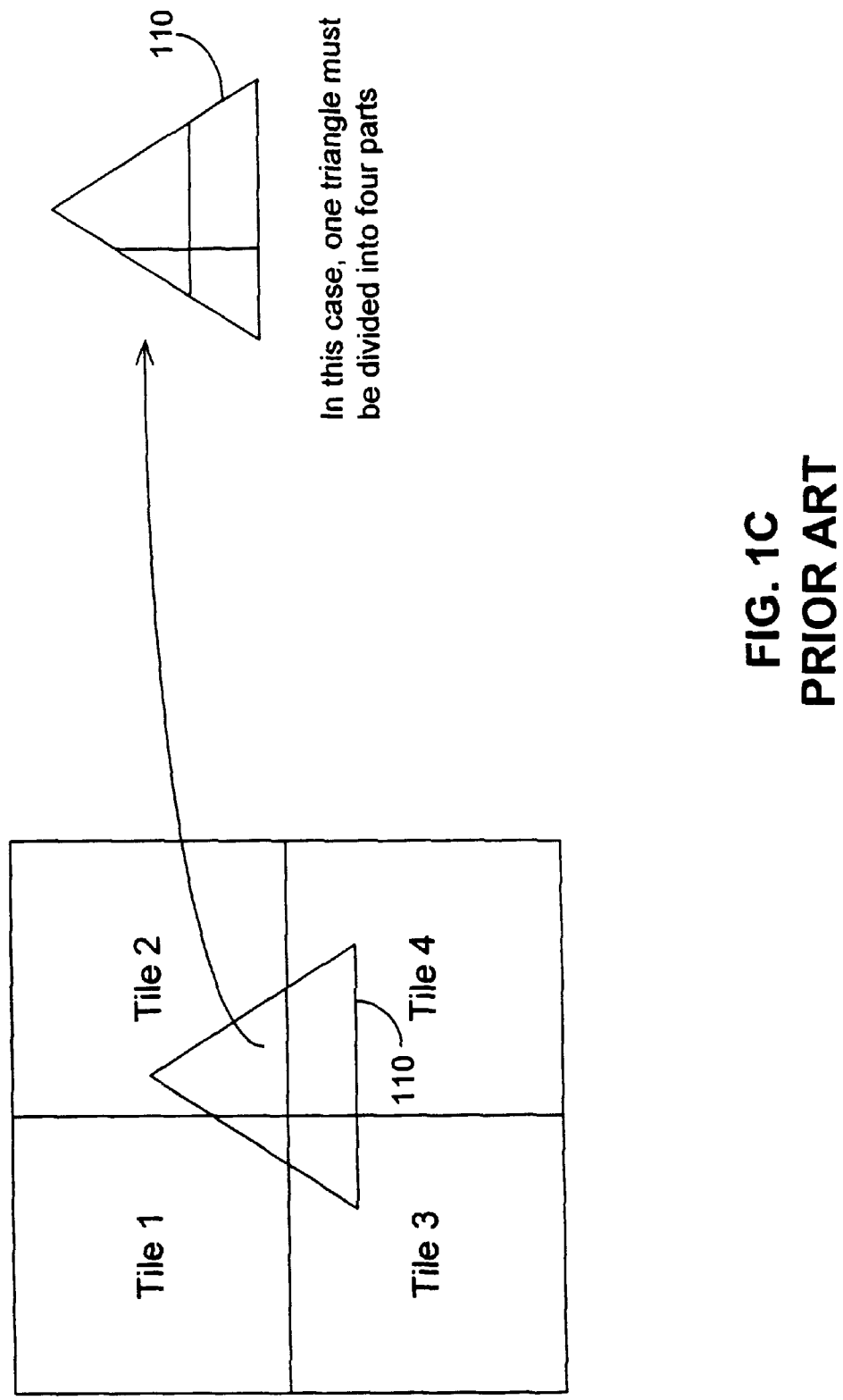
FIG. 1C illustrates how an example triangle primitive might have to be divided into parts when it overlays multiple texture image tiles.
Figure 1D:
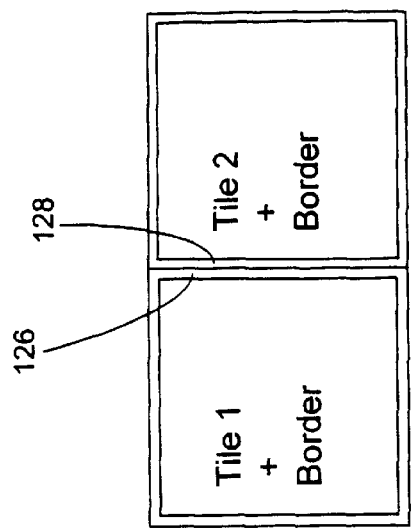
FIG. 1D illustrates the specification of borders to avoid filtering issues in texture tiling.
Figure 1D:
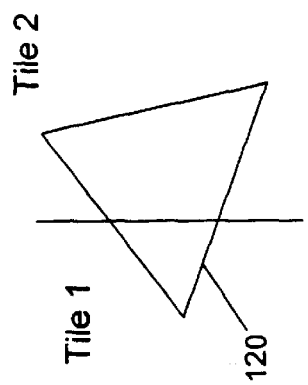
Figure 1D:
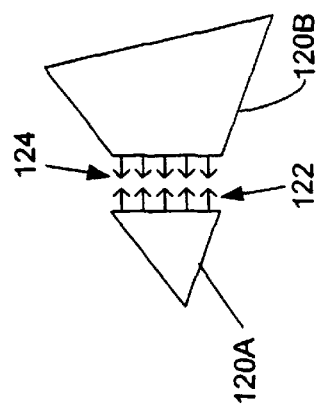
Figure 1E:
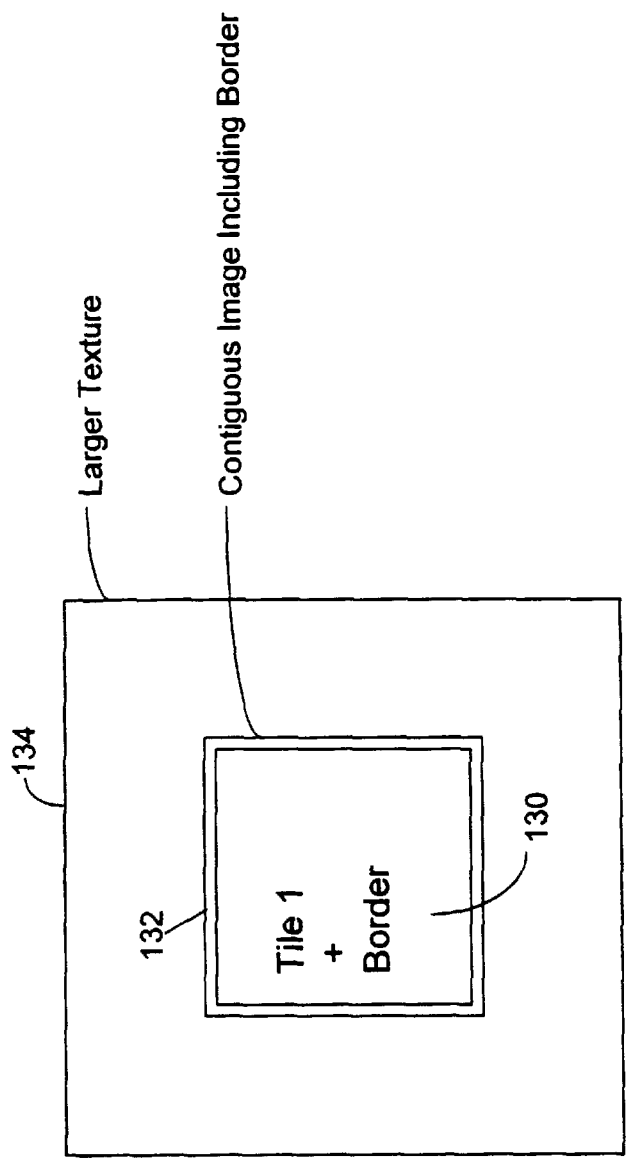
FIG. 1E is a diagram of an example tile of texture and its borders that are part of a contiguous texture memory space.
Figure 1F:
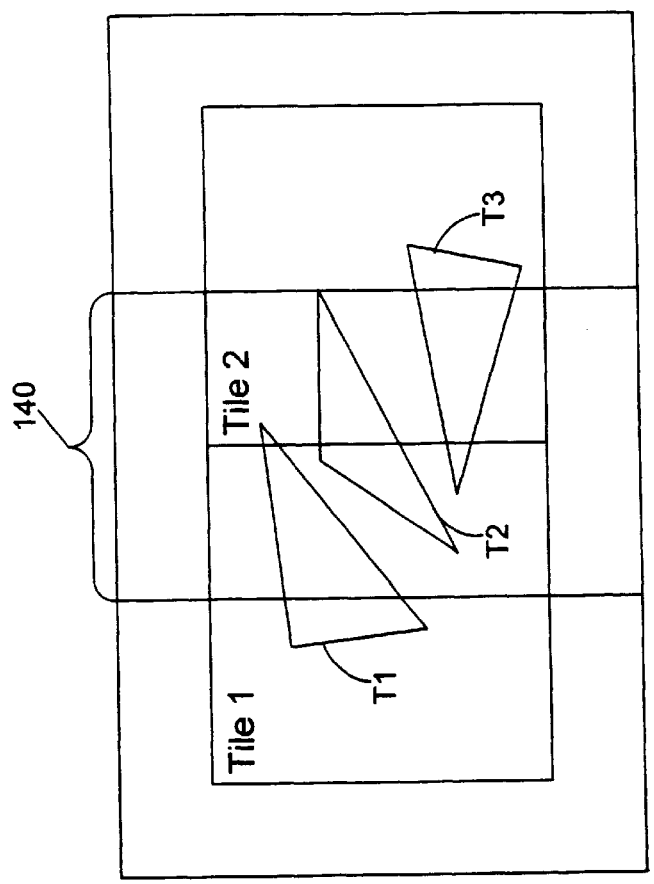
FIG. 1F illustrates an example of overlapping texture borders which can be used to supply a single texture to graphics primitives without subdivision.

In general, the number of tiling directions affects the size of a supported primitive before geometric subdivision must occur. With tiling in all directions, a graphics primitive up to two times the size of the original image tile size is guaranteed to have a unique texture object which can be bound while rendering it. With only three tiling directions supported, the graphics primitive has a guaranteed size which does not exceed the size of a texture tile. Larger sizes can be used but rely on the relationship of the primitives to the original tiling pattern. Either scenario compares extremely favorably with an overlapping texture border scheme, such as that described with respect to FIG. 1F, while avoiding the need for redundant texture downloads or complex subload work by software developers.

FIG. 12A shows an example of how texture coordinates from an initial texture tile 1 map in three directions denoted by arrows to three adjacent border texture tiles (Border Tiles 1–3). FIG. 12B shows an example of how adjacent border texture tiles (also called adjacent border images) are applied to a primitive when rendering a Tile 1 texture. Texture tiling with adjacency information is described in more detail below with a respect to a texture processing routine.

Texture Processing with Texture Adjacency Information

Figure 2A:
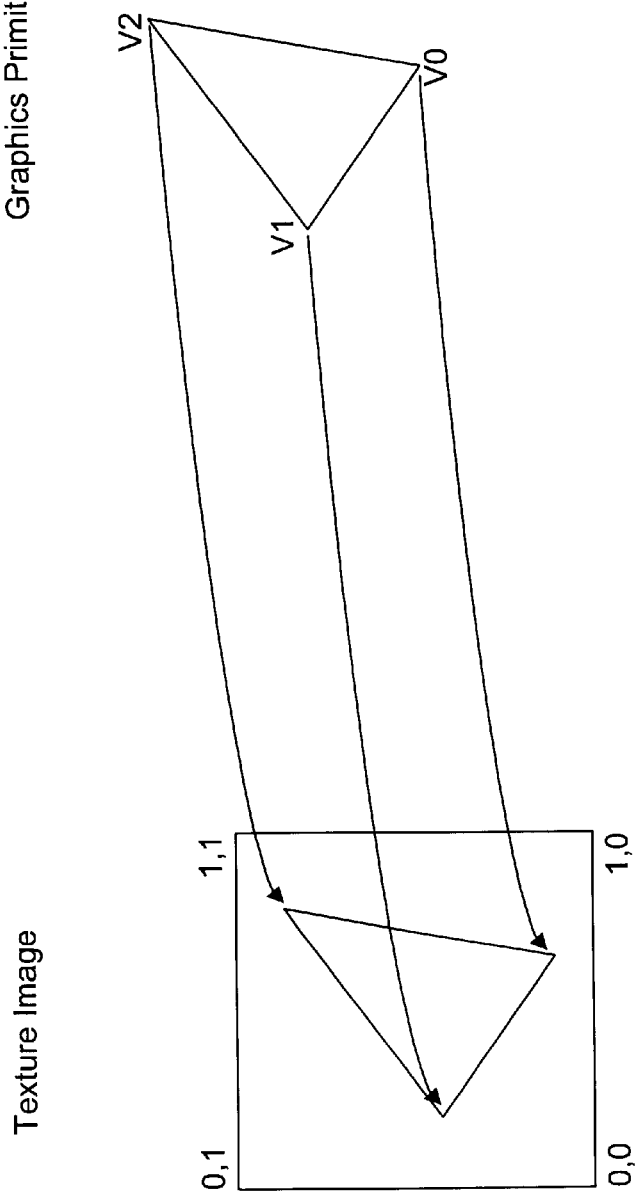
FIG. 2A shows an example of a graphics primitive mapped to a texture image.
Figure 2B:
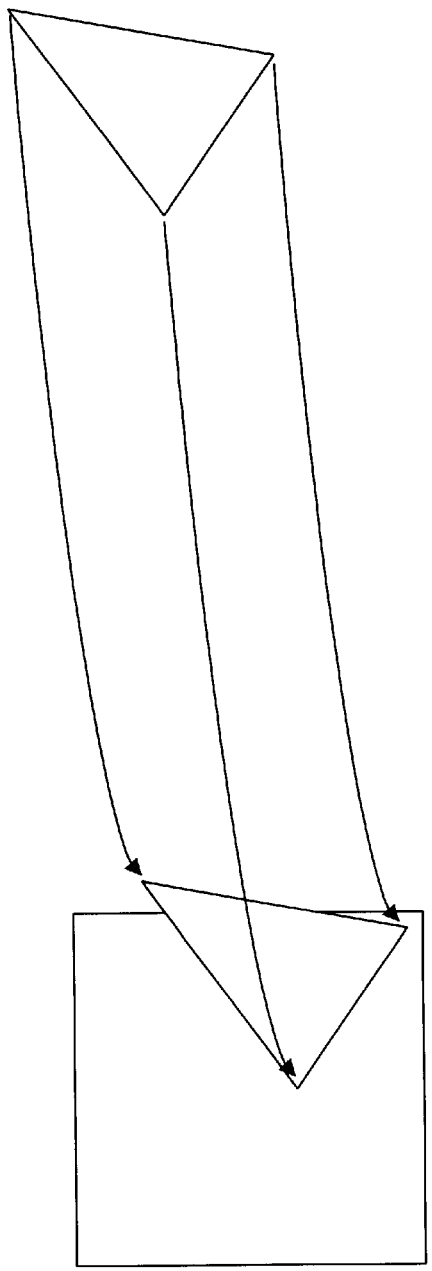
FIG. 2B shows an example of a graphics primitive that extends beyond a texture image.
Figure 3:
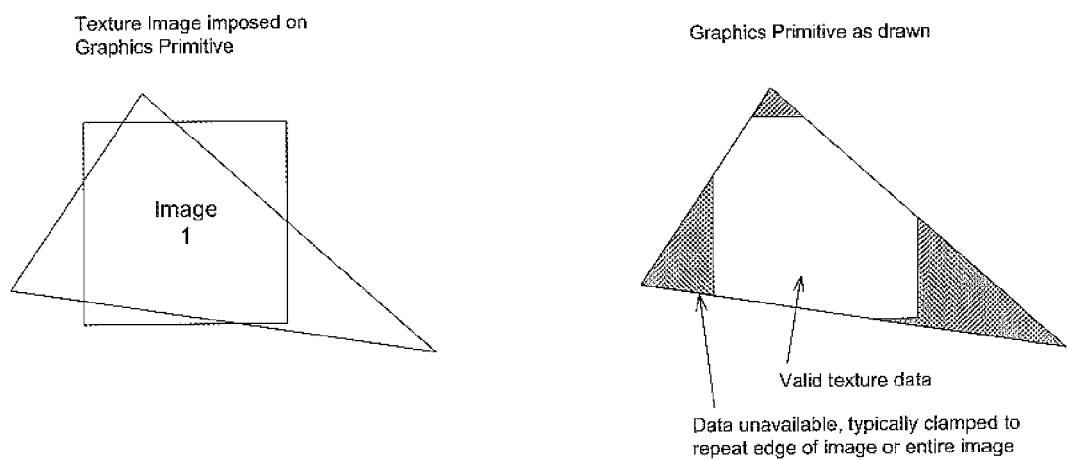
FIG. 3 shows how valid texture data is clamped or repeated to cover regions where the graphics primitive is over extended in a conventional texture tiling approach.

As described above, the present invention allows a large contiguous texture to be used even with limited texture paging resources and avoids or reduces geometry subdivision. To understand the texture processing and advantages of the present invention, it is helpful to review texture mapping briefly. As shown in FIG. 2A, in texture mapping, texture coordinates (s,t) map texels of a texture image to corresponding vertices (v0,v1,v2) of a graphics primitive. Texture coordinates are typically normalized to a range between 0 and 1 as shown in FIG. 2A. Sometimes, a graphics primitive extends beyond a texture image as shown in FIG. 2B. In this case in conventional texture tiling, the graphics primitive is drawn with valid texture data only. Texture data is unavailable for the regions where the graphics primitive is over extended. Valid texture data is either clamped or repeated to cover these regions where the graphics primitive is over extended. This is illustrated in FIG. 3.

Figure 4:
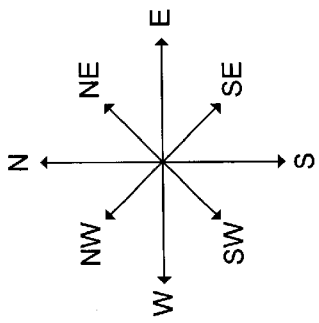
FIG. 4 shows an example according to the present invention where a texture image has eight adjacent border texture images in eight different directions.
Figure 4:
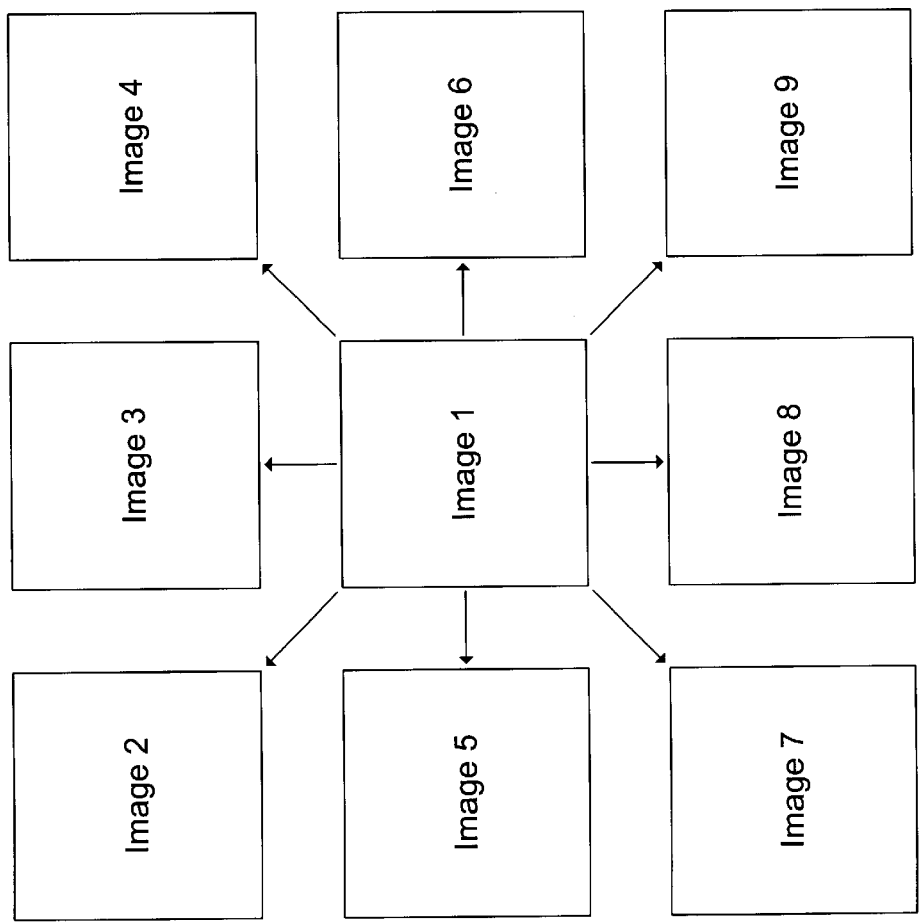
Figure 5:
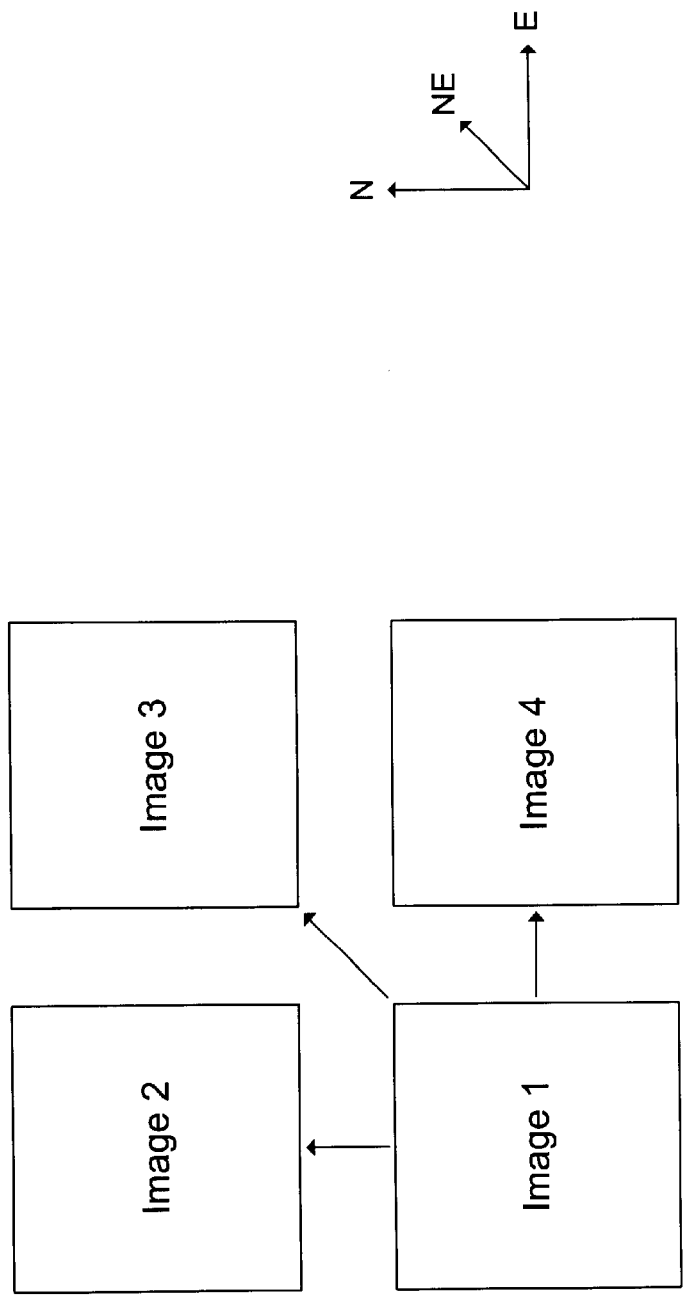
FIG. 5 shows an example according to the present invention where a texture image has three adjacent border texture images in three different directions.

The present invention uses adjacent border texture tiles to handle an extended graphics primitive. Two examples using eight and three border textures, respectively, are described in detail. FIG. 4 shows an example according to the present invention where an Image 1 has eight adjacent border texture images (Images 2–9) in eight different directions. These eight directions for example can correspond to 8 directions (N, NE, E, SE, S, SW, W, and NW) as shown. FIG. 5 shows an example according to the present invention where an Image 1 tile has three adjacent border texture images (Images 2–4) in three different directions. These three directions for example can correspond to three directions (labeled north N, northeast NE, and east E) as shown.

FIG. 6 shows how a graphics primitive that extends beyond the Image1 tile in FIG. 4 is texture mapped according to the present invention. To process the graphics primitive, texture is sampled from Image 1 and from each of the appropriate textures identified by the adjacency information. In this case, the primitive extends beyond the base Image 1 in all eight directions. Accordingly, the graphics primitive is mapped to texture sampled from image 1 and from each of the 8 adjacent border texture images (Images 2–9) as shown in FIG. 6.

FIG. 7 shows how a graphics primitive that extends beyond the Image1 in FIG. 5 is texture mapped according to the present invention. To process the graphics primitive, texture is sampled from Image 1 and from each of the appropriate textures identified by the adjacency information. In this case, the primitive extends beyond the base Image 1 in all three directions. Accordingly, the graphics primitive is mapped to texture sampled from image 1 and from each of the 3 adjacent border texture images (Images 2–4) as shown in FIG. 7.

FIG. 8A shows a routine 800 for texture processing using texture tiling and adjacency information according to one embodiment of the present invention (steps 810–830). In step 810, a base texture image and adjacent border textures are loaded in texture memory. In step 820, a base texture image is associated with adjacency information. In step 830, a graphics primitive is mapped to adjacent border textures identified by the adjacency information.

During texture processing in any computer graphics system or pipeline, mapping step 830 is carried out. In one example, in mapping a graphics primitive to adjacent border textures, two steps are carried out according to the present invention. The first step evaluates texture coordinate values to determine when texture coordinates are outside a range of a base texture image being texture mapped. The second step determines which adjacent border texture corresponds to the texture coordinates evaluated to be outside the base image. This determination is made using adjacency information which identifies the direction of the adjacent border texture relative to the base image.

FIG. 8B further shows these steps are carried out with respect to Images 1–4 (Base Image 1 and Adjacent Border Images 2–4) from the examples of FIGS. 4–7. Base Image 1 is assigned texture coordinate values (s,t) where both s and t coordinates are between 0 and 1.0. Adjacent Border Image 2 has texture coordinate values (s,t) where s is mapped between 0 and 1.0 and t is mapped from a range 1.0–2.0 to a range 0–1.0 (i.e., t=t−1.0). Adjacent Border Image 4 has texture coordinate values (s,t) where t is mapped between 0 and 1.0 and s is mapped from a range 1.0–2.0 to a range 0–1.0 (i.e., s=s−1.0). Adjacent Border Image 3 has texture coordinate values (s,t) where s and t are mapped from a range 1.0–2.0 to a range 0–1.0 (i.e., s=s−1.0 and t=t−1.0). Such coordinate transformation can be like that used in modulo addressing. See, also the example shown in FIG. 12A.

FIG. 9 shows a routine for texture processing using texture tiling and adjacency information 900 according to one embodiment of the present invention (steps 910–960). In step 910, texture coordinates are interpolated. At step 915, for each filter sample control proceeds to perform evaluation and determining steps (920–936). The evaluation steps (920–924) test the texture coordinate values to determine when texture coordinates are outside a range of a base texture image being rendered. In step 920, the s coordinate value is checked to see if it is greater than 1.0. If yes, control proceeds to step 922. If no, control proceeds to step 924. In step 922, the t coordinate value is checked to see if it is greater than 1.0. If yes, control proceeds to step 936. If no, control proceeds to step 934.

In step 924, the t coordinate value is checked to see if it is greater than 1.0. If yes, control proceeds to step 932. If no, control proceeds to step 930.

The determining steps (steps 930–936) determine which adjacent border texture correspond to the texture coordinates evaluated to be outside the base image. This determination is made using adjacency information which identifies the direction of the adjacent border texture relative to the base image. In step 930, an address is sampled from a texture image 1. In step 932, an address is sampled from an adjacent border texture image 2. In step 934, an address is sampled from an adjacent border texture image 4. In step 936, an address is sampled from an adjacent border texture image 3.

In step 940, texture samples (e.g., texel values) are fetched from memory.

In step 950, the texture samples are filtered to obtain a resultant texture value associated with a respective fragment of a graphics primitive. In step 960, the resultant texture value is combined with an interpolated color value to add texture detail to a final image for display or animation.

For convenience, FIG. 9 is described with respect to the example of three adjacent border textures as in FIG. 8B; however, this is not intended to limit the present invention. One or more adjacent border textures can be used as would be apparent to a person skilled in the art given this description. FIG. 9 is one implementation and is not intended to limit the present invention.

More Example Implementations

In one example, the texture sizes internal formats and other details of the original images are the same and the texture environment under these circumstances is the same for all images in the database and for all border images for a tile. The texture filtering for the fragments which fall on the boundary between adjacent images sample multiple texture images. Such fragments on the boundary will fetch texture sample values from multiple texture objects. Hardware implementations (including programmable hardware) can be used. One example of hardware which can be used is hardware which supports cube mapping and has an existing filtering capability which is flexible enough to support the present invention, as described herein. Such cube mapping hardware is suited to be adapted for an implementation of the present invention due to the extant requirement to filter similar situations at cube face boundaries.

The binding of a texture object can precipitate the binding of all adjacent texture objects. In this way, a texture object which needed to be addressed is resident and ready to use. This is not considered to be an onerous requirement since one reason for the extension of the present invention is the real-time roaming of large contiguous texture spaces while keeping the relevant useful texture resident. Any requisite adjacent textures should already be resident in texture memory if paging has been managed correctly by the graphics application.

In one example, a series of adjacent border texture images are not recursively applied, only those images immediately adjacent to the bound texture are applied. Although those other images may have adjacent texture borders themselves, they would only be used when they were the bound.

In another example, a series of adjacent images are recursively applied, and not only those images immediately adjacent to the bound texture.

Multitexture Approach

In another embodiment, the present invention uses multitexture units, texture matrices and black border colors at the expense of the availability of those units and performance impact where those units are being clamped and the additional cost of sending multiple texture coordinates. In one example implementation, four texture units are used in a multiple texture graphics implementation. Functional support for black border colors is also used. FIG. 10 shows an example of the primitive of FIG. 7 processed according to a multiple texturing embodiment of the present invention. The primitive with black border color produces an image with texture only where coordinates fall between 0.0 and 1.0.

Using a multitexture implementation, each texture unit supplies the bound texture for four quadrants in a quad of texture tiles. Each individual tile is clamped with correct filtering to a black border and the resulting texture images are summed. For example, in an OPENGL implementation the summing is carried out with a GL__ADD texture environment. FIG. 11 shows how multitexture units (which apply several textures to a single primitive) can be used to carry out the present invention. A texture unit 0 with image 1 is added through three adds (gl__add) to texture unit 1 with texture image 2, to a texture unit 2 with an image 3, and to a texture unit 3 with image 4 as shown in FIG. 11. Texture matrix operations apply the s and t transformations (s=s+1.0 and t=t+1.0) where appropriate. The result of the summed texture results are modulated with the interpolated lighting result using extensions for the more flexible combination of texture environments with interpolated color. Thus, it can be seen that the embodiment in FIGS. 10 and 11 is basically implementing the routine of FIG. 9 by using multitexture units and additive texture environments to sample from the base image and adjacent border texture images and to fetch the appropriate samples from memory. The fetched samples are combined pre-filtered against black. The black borders and texture matrices implement the evaluation tests.

For this to be most effective, in one example, the performance of the multiple texturing units while clamped to a black border are close to free due to the lack of memory access.

Example Environment

The present invention is described with reference to example computer graphics environments not intended to limit the present invention (FIG. 13). The present invention (including one or more steps of routine 900 as described above) can be implemented in software, firmware, hardware, or in any combination thereof. These examples are illustrative and not intended to limit the present invention.

FIG. 13 is a diagram that shows different layers of an architecture 1300 related to graphics processing in which the present invention can be implemented. Architecture 1300 includes one or more layers 1310–1340. As would be apparent to a person skilled in the art given this description, the present invention can be implemented in any one of layers 1310–1340, or in any combination of layers 1310–1340. Layer 1310 represents an application program. Layer 1320 represents a 3D graphics tool kit. For example, an object-oriented 3D graphics toolkit, such as, OPEN INVENTOR available from Silicon Graphics, Inc.

Layer 1330 represents a graphics application programming interface (graphics API) and/or other system support (such as, operating system and windowing system). OPENGL is an example graphics API. In one implementation the present invention can be implemented in OPENGL.

Layer 1340 represents hardware, including graphics hardware. Graphics hardware 1340 can be any graphics pipeline or system including, but not limited to, a computer graphics processor (single chip or multiple chips), high-end to low-end graphics workstation, gaming platform, system and console, network architecture (e.g., client/server, local, intermediate or wide area network), and virtual machine (e.g., a Java-created application). For example, graphics hardware can include but is not limited to a graphics engine sold by Silicon Graphics or NVIDIA Corporation, Santa Clara, Calif.

The present invention is described in terms of this example computer graphics system environment. However, given the description herein, it would be readily apparent to one skilled in the art how to implement the present invention in any computer graphics application, application programming interface (including, but not limited to, an OPENGL graphics API architecture), platform, or system including, but not limited to, a computer graphics processor (single chip or multiple chips), high-end to low-end graphics workstation, gaming platform, system and console, network architecture (e.g., client/server, local, intermediate or wide area network), and virtual machine (e.g., a Java-created application).

Description in these terms is provided for convenience only. It is not intended that the invention be limited to application in this example environment. In fact, after reading the following description, it will become apparent to a person skilled in the relevant art how to implement the invention in alternative environments.

Note an OPENGL graphics API architecture does not require use of the present invention. In other words, an OPENGL graphics API architecture can operate without using the advantages of the present invention as described herein.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for texture tiling comprising the steps of:
   associating a texture image with adjacency information that identifies at least one border texture adjacent to the texture image in at least one respective tiling direction;
   loading the texture image and each respective adjacent border texture in texture memory; and
   mapping at least a portion of a graphics primitive to at least one adjacent bordering texture identified by the adjacency information, comprising clamping the texture image and each respective adjacent border texture, and summing the resultant texture images.

2. The method of claim 1, wherein said mapping step comprises the steps of:
   evaluating texture coordinate values to determine when texture coordinates are outside a range of the texture image being texture mapped; and
   determining which adjacent border texture corresponds to the texture coordinates evaluated to be outside the texture image.

3. The method of claim 2, wherein said determining step comprises determining which adjacent border texture corresponds to the texture coordinates evaluated to be outside the texture image based on the adjacency information.

4. The method of claim 2, wherein said mapping step comprises the steps of:
   sampling addresses from adjacent border textures that correspond to the texture coordinates evaluated to be outside the texture image based on the adjacency information; and
   fetching texture samples from a memory based on said addresses sampled in sampling step.

5. A The method of claim 1, and wherein said associating step includes supplying the adjacency information that identifies each adjacent border texture.

6. The method of claim 1, wherein the adjacency information identifies three border textures adjacent to the texture image in three respective tiling directions, and wherein said associating step includes supplying the adjacency information that identifies each adjacent border texture.

7. The method of claim 1, wherein the adjacency information identifies eight border textures adjacent to the texture image in eight respective tiling directions, and wherein said associating step includes supplying the adjacency information that identifies each adjacent border texture.

8. The method of claim 1, wherein said mapping step includes mapping at least a portion of the graphics primitive to the loaded texture image and each respective adjacent border texture with multiple texture units.

9. The method of claim 1, wherein said summing the resultant texture images step include performing OPENGL add operations.

10. A system for texture tiling comprising:
    means for associating a texture image with adjacency information that identifies at least one border texture adjacent to the texture image in at least one respective tiling direction;
    means for loading the texture image and each respective adjacent border texture in texture memory; and
    means for mapping at least a portion of a graphics primitive to at least one adjacent border texture identified by the adjacency information, comprising means for clamping the texture image and each respective adjacent border texture, and means for summing the resultant texture images.

11. The system of claim 10, wherein said mapping means comprises:
    means for evaluating texture coordinate values to determine when texture coordinates outside a range of the texture image; and
    means for determining which adjacent border texture corresponds to the texture coordinates evaluated to be outside the texture image.

12. The system of claim 11, wherein said determining means comprises means for determining which adjacent border texture corresponds to the texture coordinates evaluated to be outside the texture image based on the adjacency information.

13. The system of claim 11, wherein said mapping means comprises:
    means for sampling addresses from adjacent border textures that correspond to the texture coordinates evaluated to be outside the texture image based on the adjacency information; and
    means for fetching texture samples from a memory based on said addresses sampled by said sampling means.

14. The system of claim 10, wherein the adjacency information identifies three border textures adjacent to the texture image in three respective tiling directions.

15. The system of claim 10, wherein the adjacency information identifies eight border textures adjacent to the texture image in eight respective tiling directions.

16. The system of claim 10, wherein said mapping means includes multiple texture units that map at least a portion of the graphics primitive to the loaded texture image and to each respective adjacent border texture.

17. The system of claim 10, wherein said summing means performs OPENGL add operations to sum the resultant texture images.

18. A method for texture processing comprising the steps of:

storing a base texture image and adjacent border textures in texture memory; for each set of texture coordinate values outside a range of the base texture image, determining a tiling direction based on the location of texture coordinate value outside the range of the base texture image;

determining an adjacent border texture which corresponds to the determined tiling direction; and fetching texture samples from the adjacent border texture.

* * * * *